US012440953B2

(12) United States Patent
Braun

(10) Patent No.: US 12,440,953 B2
(45) Date of Patent: Oct. 14, 2025

(54) HAND-HELD POWER TOOL WITH AN IMPACT MECHANISM ASSEMBLY

(71) Applicant: Robert Bosch GmbH, Stuttgart (DE)

(72) Inventor: Willy Braun, Neustetten (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/606,832

(22) Filed: Mar. 15, 2024

(65) Prior Publication Data

US 2024/0326213 A1 Oct. 3, 2024

(30) Foreign Application Priority Data

Mar. 29, 2023 (DE) ..................... 10 2023 202 866.2

(51) Int. Cl.
*B25D 11/06* (2006.01)
*B25D 17/24* (2006.01)

(52) U.S. Cl.
CPC .............. *B25D 11/06* (2013.01); *B25D 17/24* (2013.01); *B25D 2217/0092* (2013.01); *B25D 2250/331* (2013.01)

(58) Field of Classification Search
CPC B25D 11/06; B25D 17/24; B25D 2217/0092; B25D 2250/331
See application file for complete search history.

(56) References Cited

U.S. PATENT DOCUMENTS 3,203,490 A * 8/1965 McCarty ................ B25D 16/00 173/117
3,718,193 A * 2/1973 Wanner ................ B25D 11/125 173/117
4,601,351 A * 7/1986 Hartwig ............... B25D 11/125 173/205
7,624,815 B2 * 12/2009 Friedrich .................. B03C 1/30 173/90
7,971,656 B2 * 7/2011 Engelfried .............. B25F 5/006 173/162.1
11,794,325 B2 * 10/2023 Inagaki .................. B25D 11/00
2019/0308307 A1 * 10/2019 Young .................... B25D 17/24

FOREIGN PATENT DOCUMENTS

DE 2335924 A1 * 2/1975
DE 102013221094 A1 * 4/2015 ........... B25D 11/125
EP 1 872 914 A1 1/2008

* cited by examiner

*Primary Examiner* — Thanh K Truong
*Assistant Examiner* — David G Shutty
(74) *Attorney, Agent, or Firm* — Maginot, Moore & Beck LLP

(57) ABSTRACT

A hand-held power tool, in particular a demolition hammer, with an impact mechanism assembly includes an electric motor, an eccentric assembly, and an impact pin oscillating linearly along an impact mechanism axis. The eccentric assembly includes an eccentric wheel mounted in an impact mechanism carrier of the impact mechanism assembly, an eccentric wheel rotating about an eccentric axis, and a connecting rod driven by the eccentric wheel. The electric motor has a motor shaft along a motor axis which drives the impact piston by way of the eccentric wheel and the connecting rod. The eccentric wheel has an eccentric hub formed on one side, which is mounted along the eccentric axis on a side of the eccentric wheel facing away from the connecting rod proximally with a floating bearing and distally with a fixed bearing in the impact mechanism carrier.

20 Claims, 13 Drawing Sheets

HAND-HELD POWER TOOL WITH AN IMPACT MECHANISM ASSEMBLY

This application claims priority under 35 U.S.C. § 119 to patent application no. DE 10 2023 202 866.2, filed on Mar. 29, 2023 in Germany, the disclosure of which is incorporated herein by reference in its entirety.

The disclosure relates to a hand-held power tool, in particular a demolition hammer, wherein the hand-held power tool includes an impact mechanism assembly with an electric motor, an eccentric assembly and an impact pin oscillating linearly along an impact mechanism axis.

BACKGROUND

EP 1 872 914 A1 describes a demolition hammer with an impact mechanism assembly comprising an eccentric assembly. The eccentric assembly is mounted in an impact mechanism carrier of the impact mechanism assembly and comprises an eccentric wheel rotating around an eccentric axis and a connecting rod driven by the eccentric wheel. An electric motor of the impact mechanism assembly has a motor shaft along a motor axis, which drives the impact piston in a linear oscillating manner along an impact mechanism axis by way of the eccentric wheel and the connecting rod. For this purpose, the eccentric wheel is mounted by way of two fixed bearings designed as deep groove ball bearings, which are firmly connected with their respective inner rings along the eccentric axis to an eccentric hub formed on one side of the eccentric wheel. Although deep groove ball bearings have the advantage over needle roller or cylindrical roller bearings that they can also support axial forces, their load carrying capacity is significantly lower for the same size.

Instead of two fixed bearings, the bearing arranged proximal to the eccentric wheel is therefore often designed as a needle bearing in the previous art, which has a sliding seat on the inside for inserting the eccentric hub and whose outer ring is firmly pressed into the impact mechanism carrier. The necessary machining of the impact mechanism carrier must therefore be carried out from both directions along the eccentric axis with relatively great effort. The two eccentric bearings, the eccentric wheel, the eccentric hub and any additional parts must also be installed from both sides. In addition, to fix the distal fixed bearing to the eccentric wheel, the eccentric hub must be pressed against the eccentric wheel using a large press with high pressing forces. Overall, this structure is complicated and cost-intensive. Even in the case of a service repair, the outlay is very high, as special cost-intensive equipment is usually required for this.

The task of the disclosure is to provide an improved eccentric assembly for a hand-held power tool compared to the prior art, which has a very compact and lightweight design, can withstand high loads and is nevertheless inexpensive and easy to manufacture.

SUMMARY

To solve the above problem, it is provided that the eccentric wheel has an eccentric hub formed on one side, which is mounted along the eccentric axis on a side of the eccentric wheel facing away from the connecting rod proximally with a floating bearing and distally with a fixed bearing in the impact mechanism carrier. This has the particular advantage of making it possible to produce an eccentric assembly which, on the one hand, is inexpensive and easy to manufacture and, on the other hand, can withstand high radial and axial loads in relation to the eccentric axis. The floating bearing also enables axial displacement of the eccentric hub and thus the eccentric wheel in the impact mechanism carrier, so that no loads need to be absorbed in the direction of the eccentric axis. For its part, the fixed bearing fixes the eccentric hub or the eccentric wheel along the eccentric axis in a translatory manner both in the direction of the eccentric wheel and in the direction of the impact mechanism carrier.

In the context of the disclosure, hand-held power tools are generally to be understood as all battery-operated and/or mains-powered, hand-guided power tools for machining workpieces by way of an insert tool, which have an impact mechanism assembly driven by an electric motor. Electrically commutated electric motors (referred to as EC or BLDC motors), the individual phases of which are controlled via at least one power transistor by pulse width modulation in order to control and/or regulate their speed and/or torque, are in particular suitable as electromotive drives. Typical hand-held power tools in this context are so-called demolition hammers or breakers, but also impact drills, rotary hammers, chipping hammers and the like. Mains operation is to be understood in particular as operation with an alternating voltage in the range of approx. 110 to 240 V. The typical grid voltages are primarily dependent on country-specific boundary conditions.

For the battery operation of hand-held power tools, interchangeable battery packs are used whose battery voltage or voltage class results from the connection (parallel or serial) of the individual energy storage cells integrated in the interchangeable battery pack and which is usually an integer multiple (>=1) of the voltage of the individual energy storage cells. An energy storage cell is typically designed as a galvanic cell in which one cell pole is arranged on one end face and another cell pole on an opposite end face. In particular, the energy storage cell has a positive cell pole on one end face and a negative cell pole on the opposite end face. Preferably, the energy storage cells are designed as lithium-based battery cells, e.g., Li-ion, Li-polymer, Li-metal, or the like. However, the disclosure can also be applied to exchangeable replaceable battery packs having Ni—Cd cells, Ni—Mh cells, or other suitable cell types. For common Li-ion exchangeable battery packs with a cell voltage of 3.6 V, battery voltages of 3.6 V, 7.2 V, 10.8 V, 14.4 V, 18 V, 36 V, etc. can be used as examples. An energy storage cell is preferably designed as an at least essentially cylindrical round cell, with the cell poles arranged at the ends of the cylindrical shape. However, the disclosure is not dependent on the type and design of the energy storage cells used, but can be applied to any interchangeable battery packs and energy storage cells, e.g., prismatic cells, pouch cells or the like in addition to round cells. The battery voltages are primarily based on the typical cell voltages of the energy storage cells being used. For pouch cells and/or cells with a different electrochemical composition, for example, voltage values are possible that differ from those of interchangeable battery packs equipped with Li-ion cells.

By way of an electromechanical interface, the interchangeable battery pack can be connected to a corresponding complementary electromechanical interface of the hand-held power tool or a charger in a non-positive and/or positive-locking manner. The term "releasable connection" is understood in particular to mean a connection that can be released and established without a tool, i.e., manually. The design of the electromechanical interfaces and their receptacles for the frictional and/or interlocking releasable connection are not intended to be an object of the present disclosure. A person skilled in the art will choose a suitable design for the electromechanical interface depending on the power or voltage class of the hand-held power tool and/or the interchangeable battery pack, so that no further details will be given here. The embodiments shown in the drawings are therefore only to be understood as examples. So, interfaces having more electrical contacts than illustrated can in particular also be used.

In a further embodiment, the floating bearing is designed as a cylindrical roller bearing and the fixed bearing as a deep groove ball bearing. The advantage of a cylindrical roller bearing is that it can support very high loads in a compact installation space, with the inner bearing running surface being formed by the axially displaceable eccentric hub in the bearing. Since the bearing arranged proximal to the eccentric wheel must also be able to absorb significantly higher loads than the distal bearing, it is also advantageous if the floating bearing has a linear contact.

In addition, the floating bearing has an outer ring that is held in a first sliding seat of the impact mechanism carrier. A sliding seat of this type offers the advantage of particularly easy installation in the impact mechanism carrier.

The fixed bearing has an inner ring and an outer ring, wherein the inner ring is connected to the eccentric hub of the eccentric wheel without play via an interference fit and the outer ring is held in a second sliding seat of the impact mechanism carrier. A press fit of this type is easy to execute and install. It is also inexpensive and precise to manufacture. It offers backlash-free fixing and guarantees a highly resilient and durable translational and rotational connection between the inner ring and the eccentric hub.

In a further embodiment, the second sliding seat of the impact mechanism carrier has an axial end stop, via which the outer ring of the fixed bearing is fixed along the eccentric axis in a direction facing away from the eccentric wheel. In addition, the outer ring of the fixed bearing is fixed along the eccentric axis in a direction facing the eccentric wheel via a hollow cylindrical spacer sleeve, which is axially supported on the one hand via the outer ring of the fixed bearing and on the other hand via the outer ring of the floating bearing. This arrangement allows particularly easy installation of the fixed bearing, the spacer sleeve and the floating bearing as well as the remaining eccentric assembly in the impact mechanism carrier in a single direction along the eccentric axis. The easy insertion of the spacer sleeve into the impact mechanism carrier is also facilitated by the fact that its outer circumference tapers conically along the eccentric axis from the floating bearing to the fixed bearing.

The floating bearing, in particular the outer ring of the floating bearing, is fixed in the impact mechanism carrier by way of a fixing element, in particular axially along the eccentric axis. For this purpose, the fixing element is designed as a sheet metal part that can be connected to the impact mechanism carrier by way of a plurality of screw connections. This makes it possible to manufacture the fixing element particularly cost-effectively. Due to the thin wall thickness of the sheet metal part, the floating bearing can be installed with a minimum distance to the load application zones of the toothing and connecting rod forces in order to minimize the bearing loads as far as possible.

Furthermore, an air gap extending in the direction of the eccentric axis is provided between the impact mechanism carrier and the fixing element in the not yet firmly connected state. This serves as tolerance compensation and allows at least one of the components of the tensioning chain to be deformed when the fixing element is tightened, resulting in correspondingly secure tensioning. This ensures gap-free support of the fixing element despite the usually unavoidable dimensional tolerances of the components. It is particularly simple and advantageous if the fixing element has a spring-loaded tongue, in particular a sheet metal tongue, for each screw connection, which reduces, in particular closes, the air gap when the fixing element is firmly connected to the impact mechanism carrier. This ensures sufficient deformation and pretensioning by ensuring that the tongues are in firm contact with the opposite side of the impact mechanism carrier.

The eccentric wheel, the floating bearing, the fixed bearing, the spacer sleeve and the fixing element form a pre-assembled structural unit of the eccentric assembly, wherein the eccentric wheel has at least one bore for the screw connections of the fixing element. In conjunction with the elimination of the complex pressing processes for the bearings of the eccentric assembly, this ensures simple, fast, cost-effective and error-free installation of the eccentric assembly in the impact mechanism carrier. This means that the eccentric assembly can be pre-assembled separately from the main installation of the demolition hammer in a simple, time-saving and cost-effective manner and delivered to the main installation line as required. Any press-fitting processes in the impact mechanism carrier during the main installation can be omitted, so that the shaping in the impact mechanism carrier is possible from only one direction and with only a few tools. This means that it is no longer necessary to turn the heavy impact mechanism assembly several times during installation.

As an alternative or in addition to the air gap and the spring-loaded tongues of the fixing element, an elastic component acting along the eccentric axis in a direction facing the eccentric wheel is provided between the axial end stop of the second sliding seat and the outer ring of the fixed bearing. The elastic component can be designed as a wave spring, an elastomer ring or similar. Similarly, the elastic component serves as a tolerance compensation with corresponding advantages.

A particularly compact and flexible design of the hand-held power tool, which is designed in particular as a demolition hammer, can be achieved if the motor axis and the impact mechanism axis are arranged at an angle of 45° to 135°, in particular essentially at right angles, and the motor axis and the eccentric axis are arranged essentially parallel to each other.

With particular advantage, the outer housing comprises two housing half-shells, on each of which a handle is arranged, in particular decoupled from vibrations. The housing half-shells allow the impact mechanism assembly to be fastened to the outer housing on both sides and preferably symmetrically to the impact mechanism axis, which results in very good reinforcement of the large-area housing half-shells, which also improves the noise development and robustness of the hand-held power tool during the machining process. This eliminates the need for a one-piece bowl housing, in which the component deformation directions are predominantly in the direction of the impact mechanism axis. Particularly in the case of a hand-held power tool designed as a demolition hammer, the spatial expansion in the direction of the impact mechanism axis is generally the greatest, which is why the use of a cup housing here can entail corresponding disadvantages and restrictions in the manufacture of the assemblies and their arrangement, design and installation. The division of the handle sides between the two housing half-shells offers the advantage of separate force application in the two housing half-shells, which leads to optimized load distribution. Another advantage of manufacturing the handles is that their inside can be demolded in the direction of their interior during plastic injection molding. This in turn enables a simpler mold design and later easier overmolding of the hard handle component with a soft component (e.g., a thermoplastic elastomer).

BRIEF DESCRIPTION OF THE DRAWINGS

The disclosure is explained below with reference to FIGS. 1 through 11 by way of example, wherein identical reference numbers in the drawings indicate identical components having an identical function.

Shown are.

DETAILED DESCRIPTION

Figure 1:
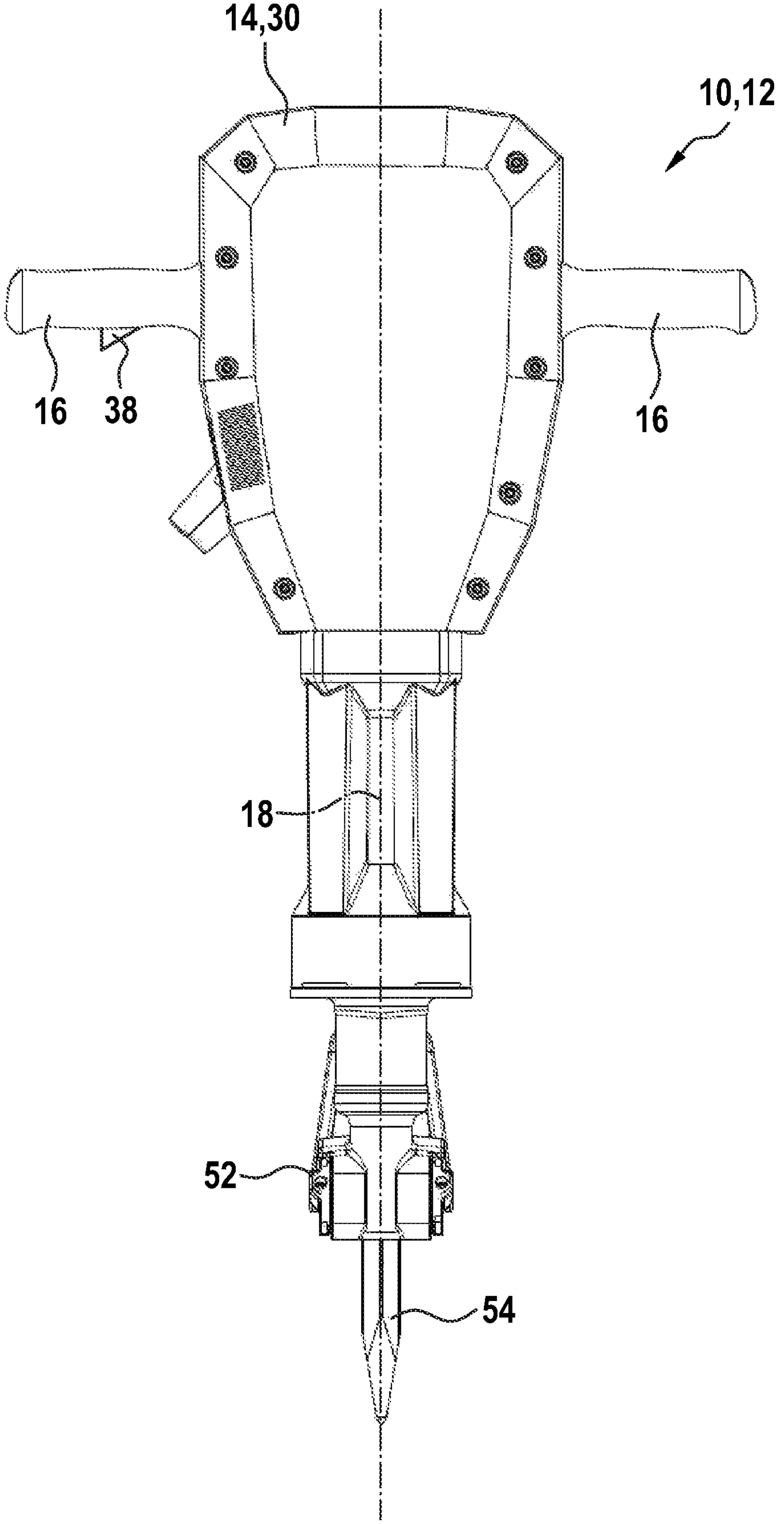
FIG. 1: a side view of a hand-held power tool designed as a demolition hammer with an outer housing.
Figure 2:
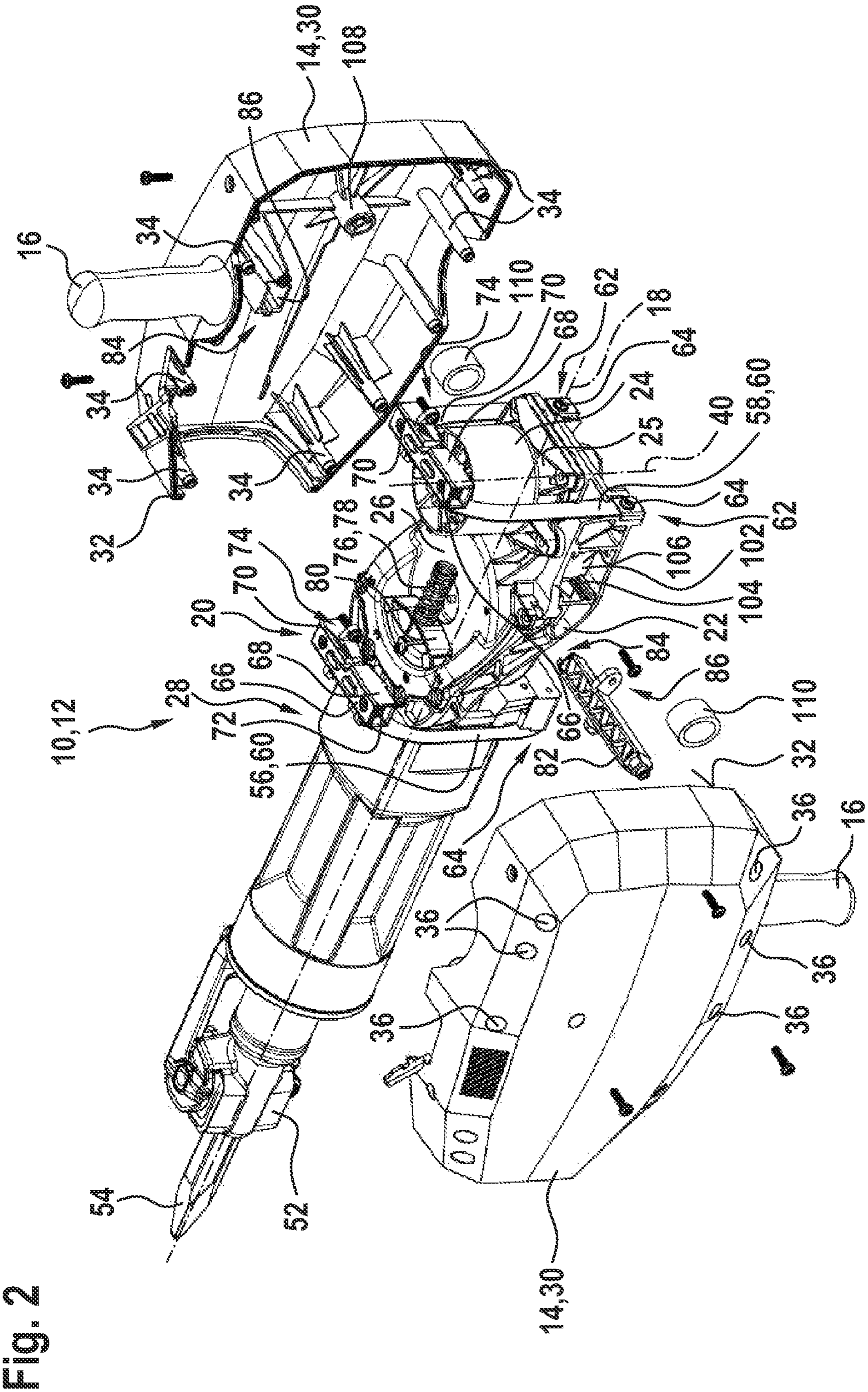
FIG. 2: a first exemplary embodiment of the demolition hammer from FIG. 1 with an impact mechanism assembly and the housing consisting of two half-shells in an exploded perspective view.

FIG. 1 shows an example of a hand-held power tool 12 designed as a demolition hammer 10 with an outer housing 14 in a side view. FIG. 2 shows the demolition hammer 10 from FIG. 1 in a perspective exploded view, which corresponds in particular to a sequence of the main installation process of the individual components of the proposed anti-vibration system.

For a processing operation, the demolition hammer is guided along an impact mechanism axis 18 by an operator via two handles 16 arranged on the outer housing 14. For processing a workpiece not shown, for example a concrete floor or the like, the demolition hammer 18 has an impact mechanism assembly 20 with an impact mechanism carrier 22 on which an electric motor 24, an eccentric assembly 26 and a mechanical impact mechanism 28 are arranged, the outer housing 14 surrounding the electric motor 24 and the eccentric assembly 26 of the impact mechanism assembly 20. The two handles 16 form a so-called T-handle due to their arrangement on the outer housing 14. However, it is also conceivable to use a D-handle, such as is commonly used as the main handle on rotary hammers, a combination of a T-handle and a D-handle or similar. The outer housing 14 essentially consists of two housing half-shells 30, whose connecting edges 32 run along the impact mechanism axis 18 and which are designed as a tongue-and-groove connection to prevent relative movements between the housing half-shells 28 and to simplify their installation. The two housing half-shells 30 of the outer housing 14 are held together by a plurality of screw connections, which can be screwed through through-holes 34 of one housing half-shell 30 into correspondingly positioned screw bosses 36 of the other housing half-shell 30.

The electric motor 24 is controlled by control or regulating electronics of an electronics unit 25, which is also accommodated in the outer housing 14 but is not shown in greater detail, via a main switch 38 preferably arranged on at least one of the handles 16, in order to influence its speed and/or torque. If the electric motor 24 is designed as an EC or BLDC motor, the speed and/or torque is generally influenced by the control or regulation electronics via pulse width modulated (PWM) control of the power electronics of the electronics unit 25, which is not shown in detail. Since such a PWM control and the associated electronic components are known to the person skilled in the art, this will not be discussed further. Instead of a brushless electric motor, a conventional brushed DC motor, an AC motor or the like with a corresponding upstream electronics unit 25 can be used as an alternative. The electric motor 24 drives the eccentric assembly 26 by way of a motor shaft 42 (see FIG. 4) arranged along a motor axis 40 via a gearbox 44, which is not shown in detail, in such a way that the rotary movement of the motor shaft 42 is converted into a linearly oscillating movement of an impact piston 50 along the impact mechanism axis 18 via an eccentric wheel 46 provided with an external toothing and a connecting rod 48 of the eccentric assembly 26 driven thereby (see also FIG. 7). The impact piston pin 50 then strikes an insert tool 54, which is accommodated in a tool receptacle 52 and is designed as a chisel in the present exemplary embodiment, in a pulsed manner to machine the workpiece. The motor axis 40 and the impact mechanism axis 18 of the demolition hammer 10 are arranged essentially at right angles to each other. The term "essentially" should be understood to mean that a deviation from the right angle is not immediately recognizable to the naked eye without further aids. Instead of a right-angled arrangement, it is also conceivable that the motor axis 40 and the impact mechanism axis 18 are arranged at an angle of 45° to 135° to each other, depending on the design of the hand-held power tool 12.

FIG. 2 illustrates the mounting of the impact mechanism assembly 20 in the outer housing 14 of the demolition hammer 12, which consists of the two housing half-shells 30. The impact mechanism assembly 20 is mounted in the outer housing 14 by way of a first coupling element 56 and a second coupling element 58. Along the impact mechanism axis 18, the first coupling element 56 is arranged in a region between the impact piston 50 and the motor axis 40 and the second coupling element 56 is arranged outside this region, i.e., behind the motor axis 40 as seen from the impact piston

50. The second coupling element 58 does not extend in the direction of the impact mechanism axis 18 beyond a maximum extension of the impact mechanism assembly 20. In this way, a reduction in the installation space can be achieved compared to the known solutions from the prior art, so that the outer housing 14 can be kept very compact, particularly along the impact mechanism axis 18. In conjunction with high vibration damping, this also allows greater flexibility in the design of the outer housing 14 and, if necessary, the arrangement of the handles 16.

The two coupling elements 54, 58 are each formed as a thin-walled, U-shaped sheet metal part 60, the main plane of extension of which is aligned essentially at right angles to the impact mechanism axis 18. The coupling elements 54, 58 are each connected at their open ends 62 to the impact mechanism carrier 22 of the impact mechanism assembly 20 in a non-positive manner via a screw connection 64. By fastening each sheet metal part 60 to the impact mechanism assembly 20 at both ends, a particularly rigid connection can be achieved, in particular transverse to the impact mechanism axis 18, so that primarily only a relative movement between the impact mechanism assembly 20 and the outer housing 14 along the impact mechanism axis 18 is permitted. Furthermore, each sheet metal part 60 has a fold 66 in a centrally arranged region between the two open ends 62, which extends essentially at right angles to the main plane of extension of the sheet metal part 60 and thus along the impact mechanism axis 18. Via the fold 66, each sheet metal part 60 is positively connected to a corresponding fastening element 68 for the outer housing 14 by way of a latch 70, for example a snap-in element of the fastening element 68 that can be clipped into the sheet metal part 60. Furthermore, the fold 66 has the effect of stiffening the sheet metal part 60. The two fastening elements 68 are designed as plastic square profiles which are inexpensive to manufacture and which are in turn positively connected to the housing half-shells 30 of the outer housing 14 via at least one tongue-and-groove connection 72 and additionally non-positively connected via a screw connection 74 (see also FIGS. 3 and 4*a*). The screw connection of the two housing half-shells 30 creates an additional frictional connection between the fastening elements 68 and the outer housing 14, resulting in a stiffened, reinforced, large-volume housing region. The sheet metal parts 60 and fastening elements 68 are advantageously constructed identically. Since the complete flow of force takes place via the two coupling elements 56, 58, these are kept very robust by the multiple force and form-fit connections between the impact mechanism assembly 20 and the outer housing 14. Alternatively, the coupling elements 56, 58 can also have other bearing and fastening forms. For example, at least one coupling element can be designed as a linear guide or as an articulated arm with a pivot bearing on one side. Similarly, more than two coupling elements are conceivable between the impact pin 50 and the rear, maximum extension of the firing mechanism unit 20 (i.e., its end opposite the insert tool 50).

For vibration damping of the impact mechanism assembly 20 in the outer housing 14 or for reducing the vibrations acting on the operator during the processing operation with the demolition hammer 10, an elastic damping element 78 in the form of a helical compression spring 76 is provided between the impact mechanism assembly 20 and the outer housing 14 in such a way that it is arranged in front of the second coupling element 58 or in front of the motor axis 40 in the direction of the impact mechanism axis 18 as seen from the impact piston 50. To simplify installation of the impact mechanism assembly 20, the helical compression spring 76 is friction-locked to a first retaining element 80 of the impact mechanism carrier 22. Furthermore, a second retaining element 82 is provided between the outer housing 14 and the helical compression spring 76 for force-locking fixation of the helical compression spring 76 in the installed state of the impact mechanism assembly 20, the second retaining element 82 being positively connected to the outer housing 14 via a tongue-and-groove connection 84 and non-positively connected to the outer housing 14 via an additional screw connection 86. The tongue and groove connection 84 is formed between the second retaining element 82 and a complementary receptacle 86 of one of the two housing half-shells 30 of the outer housing 14.

Figure 3:
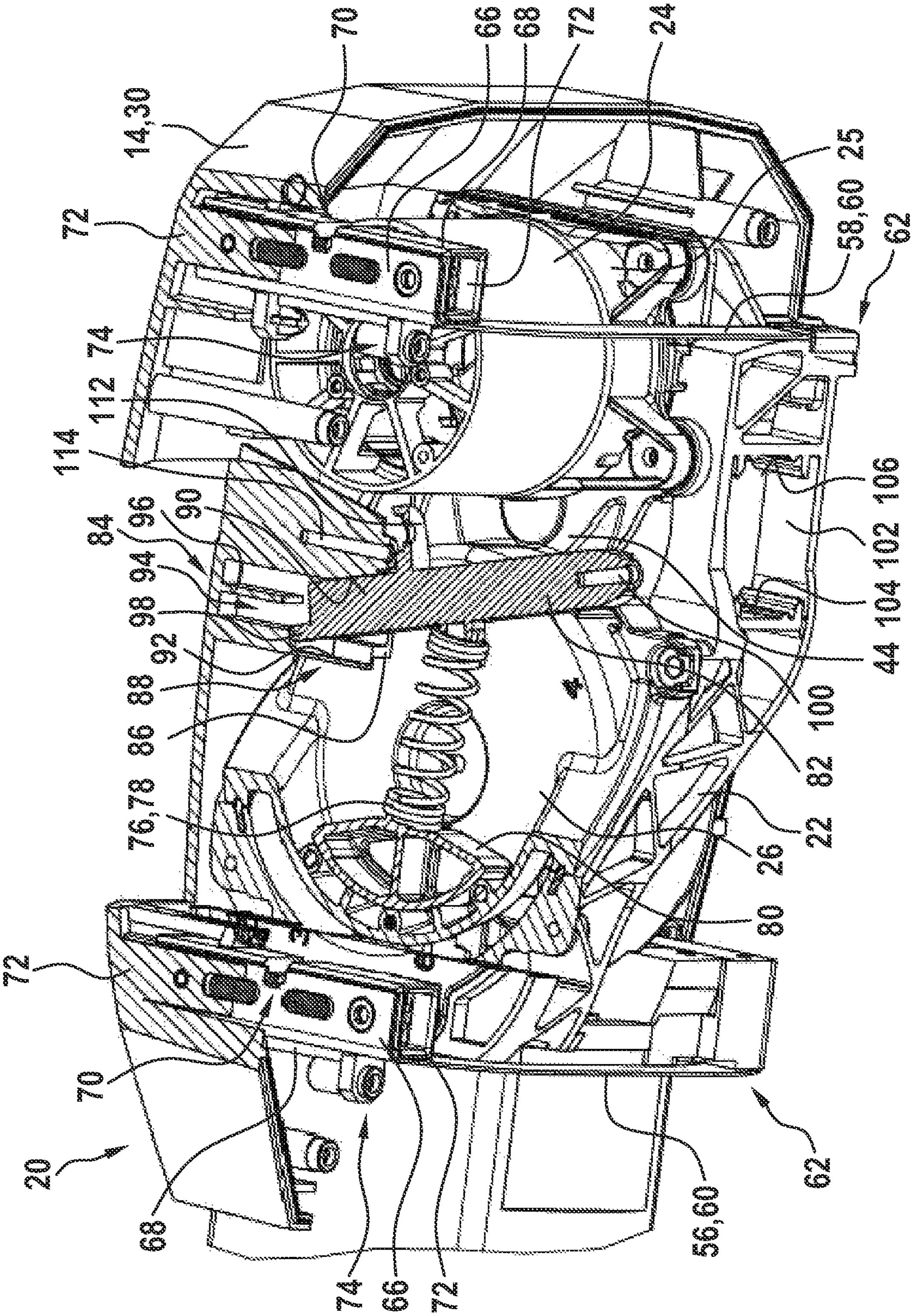
FIG. 3: a sectional perspective view of the impact mechanism assembly inserted into one of the two housing half-shells as shown in FIG. 2, FIG. 4: a partial region of the impact mechanism assembly inserted into the two housing half-shells as shown in FIGS. 2 and 3 in a first section (FIG. 4*a*) and a section perpendicular thereto (FIG. 4*b*) parallel to an impact mechanism axis of the impact mechanism assembly.

FIG. 3 shows a detailed perspective view of the impact mechanism assembly 20 according to FIG. 2 inserted in one of the two housing shells 30, wherein the tongue and groove connection 84 between the receptacle 86 provided on the housing half-shell 30 and the second retaining element 82 will be primarily discussed below. The receptacle 86 comprises an insertion region 88 with an insertion slope 90 and an opposing insertion groove 92 as well as a rectangular end region 94 with a web 96. For its part, the second retaining element 82 has a guide lug 98 at an open end, with which it can be inserted into the insertion groove 92 of the insertion region 88, while the end region 94 serves as an axial stop and for fixing the second retaining element 82.

When installing the impact mechanism assembly 20 in the housing half-shell 30, the second retaining element 82 is now initially inserted at an angle into the receptacle 86 of the housing half-shell 30. By way of its guide lug 98, it is guided in the insertion groove 92 of the receptacle 86 and pre-fixed at the end of the insertion groove 92 in a first position, as shown in FIG. 3. In this first position, the relaxed helical compression spring 76 can also be pre-fixed between the first retaining element 80 and a lateral projection of the second retaining element 82. In the next installation step, the second retaining element 82 is pivoted against the helical compression spring 76 and brought into its pretensioned end position in such a way that the guide lug 98 gradually disengages from the insertion groove 92 during pivoting, so that the second retaining element 82 can be pushed further axially into the end region 94 of the receptacle 86. As soon as the web 96 of the end region 94 is reached, the spring force is absorbed by the end region 94 and no longer needs to be held manually. Finally, the second retaining element 82 is screwed to the second housing half-shell 30 placed on the first housing half-shell 30 via a screw connection 100 provided at the open end opposite the guide lug 98. This state is shown in FIG. 4*a*.

In order to limit the outer housing 14 in its mobility relative to the impact mechanism assembly 20 along the impact mechanism axis 18, a recess 102 is provided on the impact mechanism carrier 22 of the impact mechanism assembly 20, axially symmetrically to the impact mechanism axis 18, with a first or front end stop 104 for the fully compressed—i.e., fully pressed—drop, as seen from the impact mechanism piston 50, and a second or rear end stop 106 for the extended—i.e., not pressed—drop of the impact mechanism assembly 20 in the outer housing 14. The two end stops 104, 106 of the recess 102 limit the movement of the impact mechanism assembly 20 in the outer housing 14 in such a way that they interact with a cylindrical end stop boss 108 of the housing half-shell 30 in the direction of the impact mechanism axle 18.

Figure 4A:
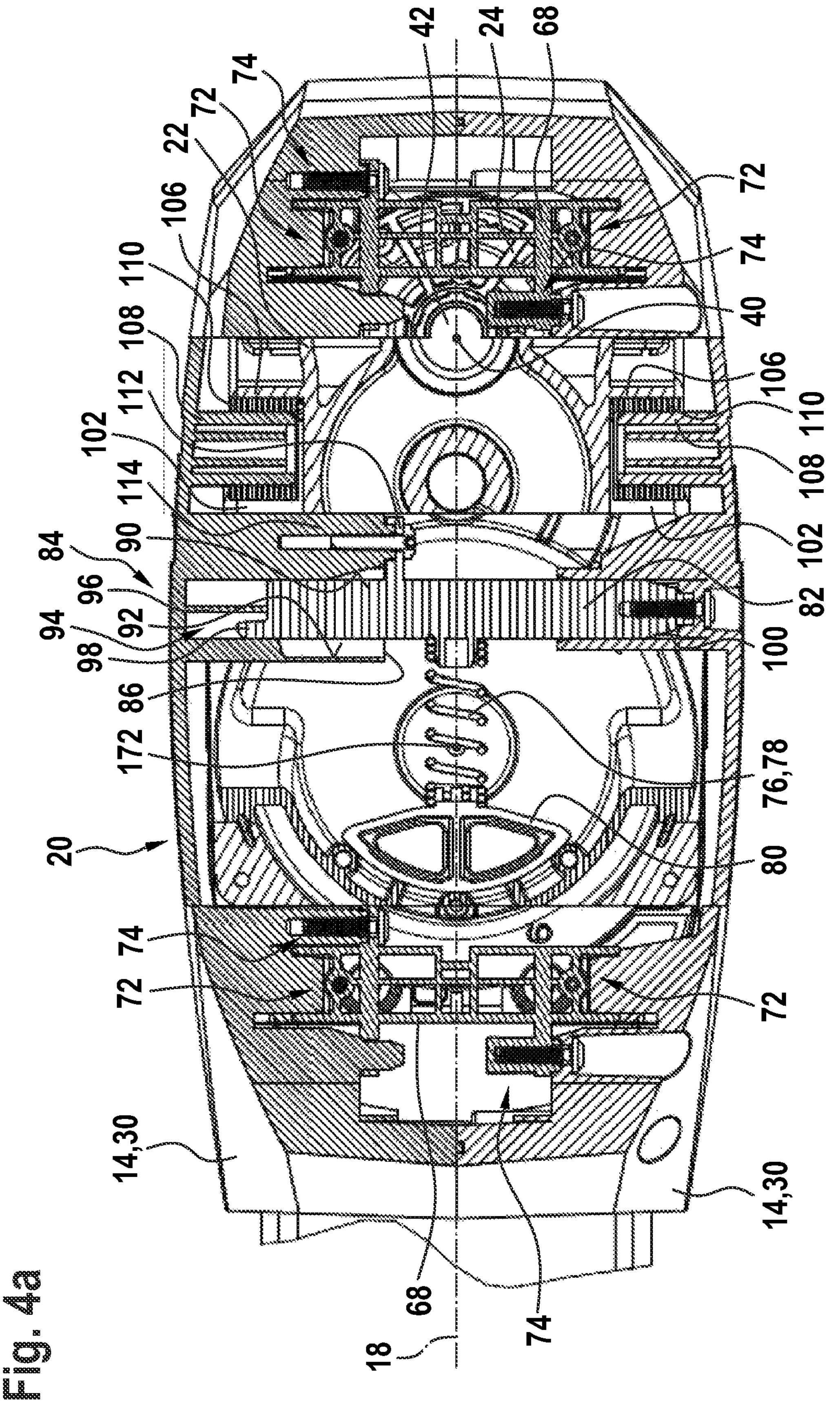

FIG. 4 shows sections through the fully installed demolition hammer 10 in a top view along the motor axis 40 (FIG. 4*a*) and a side view perpendicular to the motor axis 40 (FIG.

4*b*), with the impact mechanism assembly 20 in the extended state, so that the end stop boss 108 rests against the second end stop 106. The axially symmetrical arrangement of the recesses 102 with respect to the impact mechanism axis 18 prevents any tilting of the impact mechanism assembly 20 in the outer housing 14 and thus an unfavorable load on the two coupling elements 56, 58 transverse to their main planes of extension (see also FIG. 2). Damping of the two end stops 104, 106 is also achieved by the fact that the cylindrical end stop bosses 108 are each encased by a hollow cylindrical damping element 110, which is formed by a thermoplastic elastomer, for example. The two recesses 102 of the impact mechanism carrier 22 embrace the end stop bosses 106 together with the damping elements 110 both in the direction of the impact mechanism axis 18 and in the two other spatial directions perpendicular to it. This means that all stop directions can be realized using two central, uniform and easy-to-execute assemblies. This enables a cost-effective, easy-to-install, tunable and precise end stop solution.

The installation of the described main components of the demolition hammer 10 is essentially transverse to the impact mechanism axis 18. The most extensive and heaviest assembly of the demolition hammer 10 is the completely pre-assembled impact mechanism assembly 20 as shown in FIG. 3. This is inserted transversely to a plane spanned by the impact mechanism axis 18 and the motor axis 40 into the first housing half-shell 30 having the receptacle 86 in the manner already described, the damping element 110 having previously been pushed onto the end stop boss 108 of the first housing half-shell 30 with a slight undersize to prevent loss. The two fastening elements 68 latched to the sheet metal parts 60 are then fixed positively in the first housing half-shell 30 by way of several cascaded tongue-and-groove connections 72 and screwed positively to the first housing half-shell 30 via the screw connections 74. After the second retaining element 82, which has been moved into its pre-tensioned end position, has been firmly screwed to a screw boss 114 provided in the first housing half-shell 30 via a laterally attached projection 112 and all electrical wiring, which will not be discussed in detail here, has been laid, the second housing half-shell 30 is finally screwed to the first housing half-shell 30 in the manner already described. In addition, the two fastening elements 68 are bolted positively to the second housing half-shell 30 via the tongue and groove connections 72 and non-positively via the screw connections 74, and the second retaining element 82 is screwed non-positively to the second housing half-shell 30 via the screw connection 100. This multi-stage screw connection of the two housing half-shells 30 via the anti-vibration system achieves a very robust anchoring and stiffening of the housing half-shells to each other. In order to achieve an optimum large-volume, rigid connection not only in the installation direction, the fastening elements 68 are also friction-locked to the two housing half-shells 30 from the outside in the direction of the motor axle 40 by way of further screw connections.

Figure 5A:
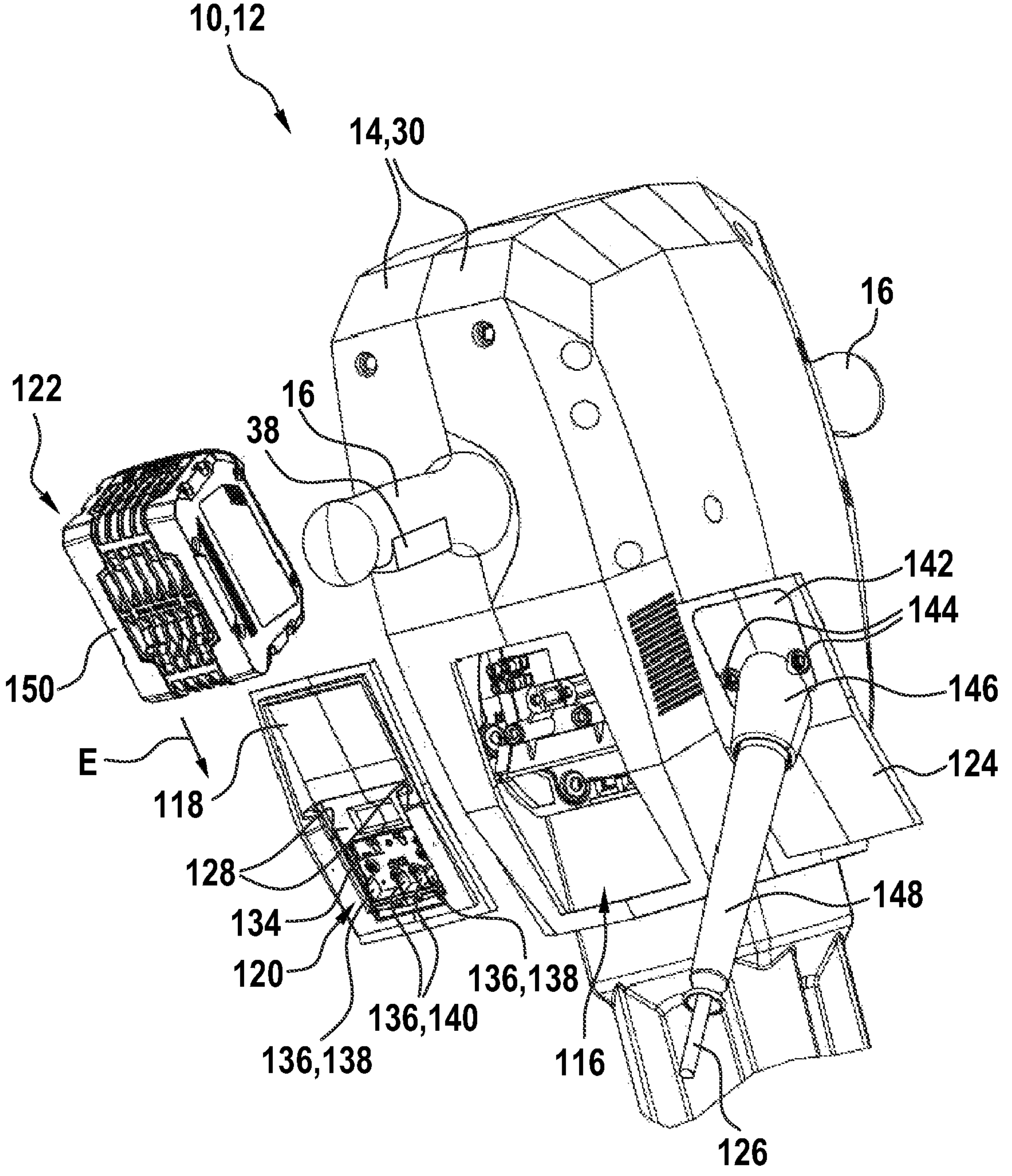
FIG. 5: a further exemplary embodiment for the power supply of the demolition hammer (FIG. 5*a*) with two optional interface modules and an interchangeable battery pack (FIG. 5*b*) that can be used in conjunction with the first interface module, shown in a perspective view.

FIG. 5*a* shows a further exemplary embodiment of the power supply for the demolition hammer 10 in a perspective view. An opening 116 is provided in the outer housing 14 of the demolition hammer 10, into which either a first interface module 118 with an electromechanical interface 120 for receiving an interchangeable battery pack 122 or a second interface module 124 with a mains cable 126 can be inserted for supplying power to the electric motor 24 and the electronics unit 25. This makes it easy and safe to provide the demolition hammer 10 for battery operation with a battery voltage Us or mains operation with a mains voltage $U_{AC}$ that is significantly higher than the battery voltage Us without having to adapt or replace other assemblies of the demolition hammer, in particular its electronics unit 25.

The electromechanical interface 120 of the first interface module 118 serves to receive the interchangeable battery pack 122, which can be detached without tools, in such a way that the operator can insert the interchangeable battery pack 122 into the electromechanical interface 120 by hand and disengage it again. For this purpose, the electromechanical interface 120 has two guide grooves 128 spaced apart in parallel in the insertion direction E of the interchangeable battery pack 122, into which the interchangeable battery pack 122 can be inserted with corresponding guide rails 130 of its electromechanical interface 132 (see FIG. 5*b*). Furthermore, the first interface module 118 comprises a preferably spring-mounted contact plate 134 arranged between the guide grooves 128 and having a plurality of electrical contacts 136, which are designed as power supply contacts 138 for the electrical power supply of the demolition hammer 10 and as signal contacts 140 for data or signal transmission. Preferably, the electrical contacts 136 of the electromechanical interface 120 of the first interface module 118 are formed as contact tabs or sheet metal and the electrical contacts 136 of the interchangeable battery pack 122 are formed as contact tulips that surround the contact tabs in the connected state.

The second interface module 124 for mains operation comprises an insert 142 which can be replaced by the operator of the demolition hammer 10 and which can be permanently connected to the mains cable 126. The insert 142 is fixed to the second interface module 124 by way of screw connections 144. Furthermore, the insert 142 and the second interface module 124 have a fixing flange 146 for fixing a cable grommet 148 encasing the mains cable 126, which is intended to protect the mains cable 126 from damage, for example due to excessive kinking or the like.

The interface modules 118, 124 differ not only in the primary type of power supply (battery or mains operation) and thus in their interfaces (electromechanical interface 120 for the interchangeable battery pack 122 or mains cable 126) outside the outer housing 14, but also in the different supply lines, their routing and the downstream power electronics (see also FIGS. 6 and 7) inside the outer housing 14. Nevertheless, they allow the use of many identical parts for battery and mains operation, so that the individual variants can be built on the basis of a common platform for which as many components as possible can be used equally. The geometry of the interface modules 118, 124 can thus be easily adapted to the outer geometry of the outer housing 14, which enables particularly simple and cost-efficient use for hand-held power tools of different performance classes and areas of application. Since the outer housing 14 must be dismantled into its two housing half-shells 30 in order to replace the two interface modules 118, 124, this is preferably carried out by the manufacturer of the demolition hammer 10. However, it is also conceivable that the replacement can be carried out by a service workshop or by an appropriately trained operator.

Figure 5B:
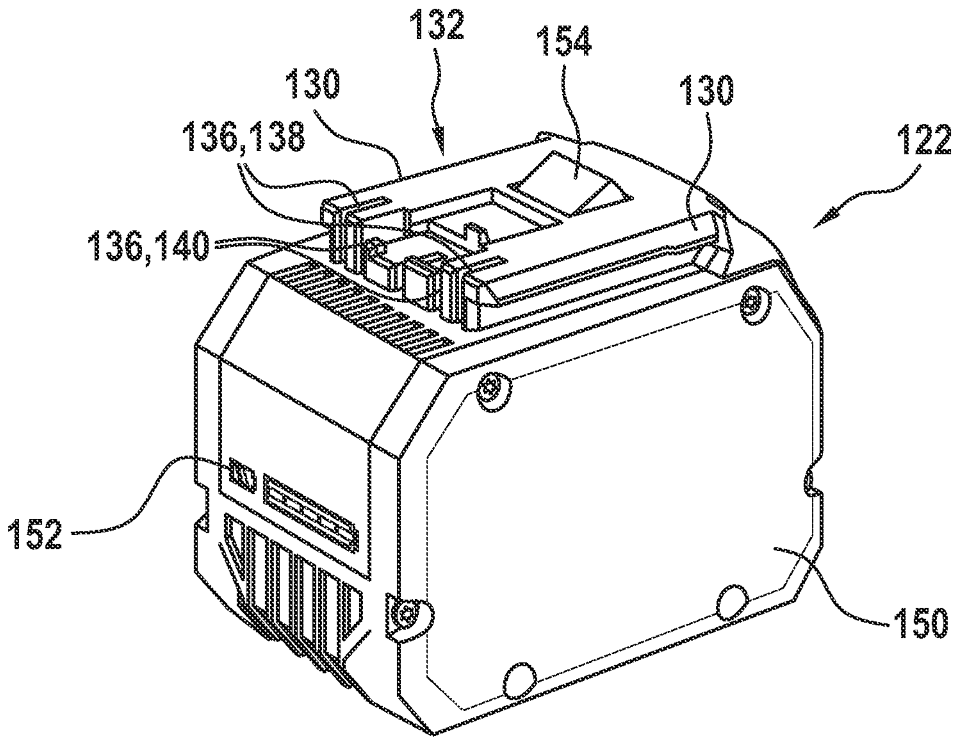

In FIG. 5*b*, the interchangeable battery pack 122 is shown for use with the first interface module 118. A plurality of energy storage cells (not shown) is accommodated in a housing 150 of the interchangeable battery pack 122. A subset of energy storage cells is connected in parallel to form a so-called cell cluster, which in turn are connected in series, so that with a cell voltage $U_{cell}$ of 3.6 V each, the resulting battery voltage $U_B$ of 18 V is obtained, which is applied to the energy supply contacts 138 of the electromechanical interface 132 of the interchangeable battery pack 122. A charge status indicator 152 is provided on the outer surface of the housing 150 of the interchangeable battery pack 122, via which the charge status and any critical operating states of the interchangeable battery pack 122, such as overheating, can be indicated. The electromechanical interface 132 of the interchangeable battery pack 122 has the two guide rails 130, which are guided when inserted into the corresponding guide grooves 128 of the electromechanical interface 120 of the first interface module 118 or of a charger not shown. In addition, a locking element 154 is provided, which serves to lock the inserted interchangeable battery pack 122 in the electromechanical interface 120 of the first interface module 118. The locking element 154 is designed as a pivotable and elastically mounted latching that engages automatically at the end of the insertion process. The inserted interchangeable battery pack 122 can be unlocked by actuating a mechanical actuating element (not shown), which is arranged on a side of the interchangeable battery pack 122 opposite the charge status indicator 152. Via the signal contacts 140 of the electromechanical interfaces 120, 132, further electrical operating parameters of the interchangeable battery pack 122, such as a measured temperature value T, a resistance value of a coding resistor for identifying the interchangeable battery pack 122 or the like, can be transmitted to the demolition hammer 10. Since the person skilled in the art is essentially familiar with the basic structure of the interchangeable battery pack 122 and the type of operating parameters transmitted, this will not be discussed in more detail below.

Figure 6:
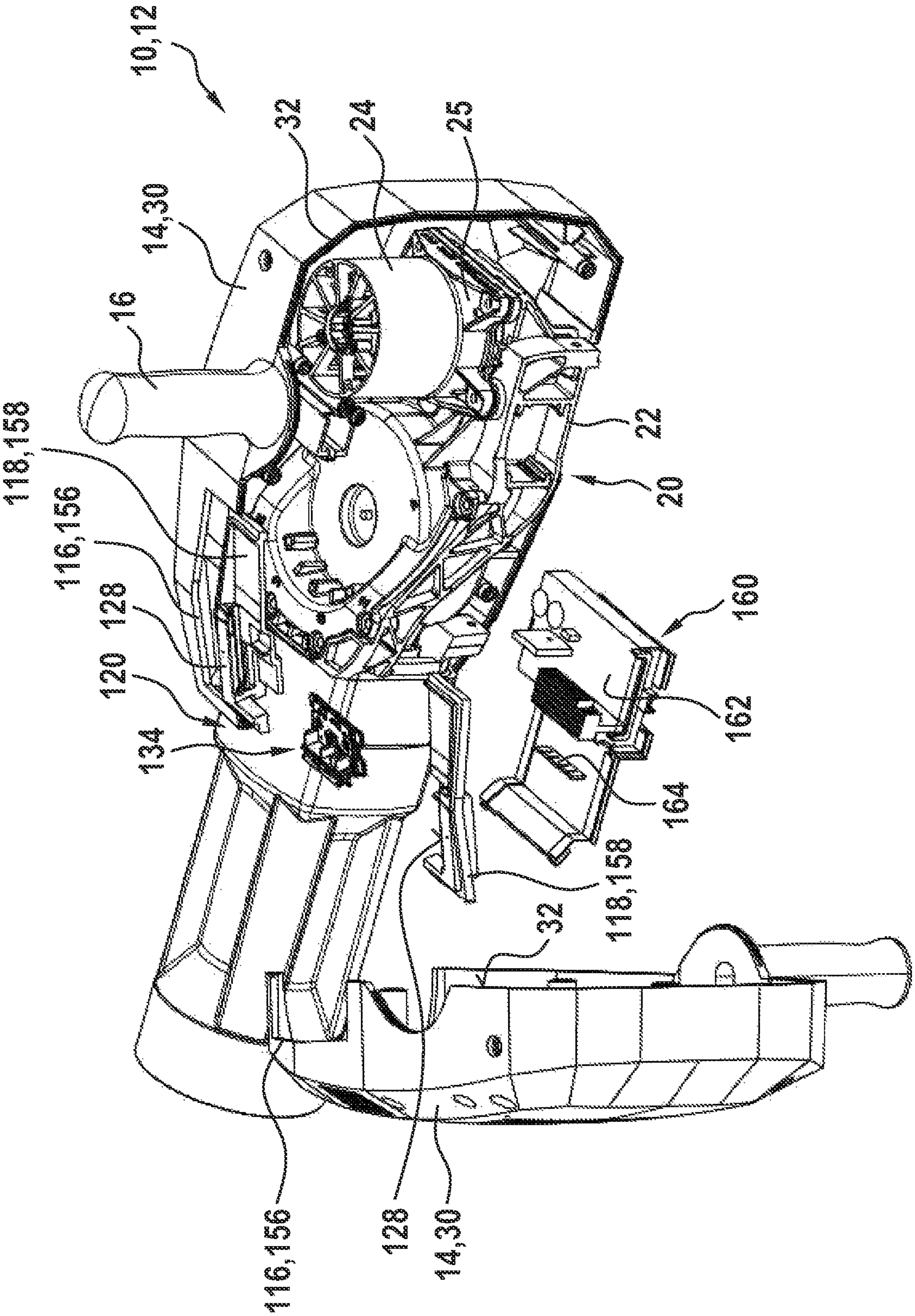
FIG. 6: a perspective exploded view of an installation sequence for the demolition hammer equipped with the first interface module for power supply by way of the interchangeable battery pack.

FIG. 6 shows an imagined installation sequence for the demolition hammer 10 equipped with the first interface module 118 for power supply by way of the interchangeable battery pack 122 in an exploded perspective view. For the sake of clarity, the components of the anti-vibration system described above have been largely omitted. The opening 116 of the outer housing 14 is divided into two equally sized partial openings 156 along the connecting edges 32 of the two housing half-shells 30. Accordingly, the first interface module 118 for the interchangeable battery pack 122 is also constructed in two parts such that one part 158 of the first interface module 118 has a guide rail 128 of the electromechanical interface 120. The two parts 158 are insertable into the partial openings 156 of the housing half-shells 30 by way of a tongue-and-groove connection in such a way that, when the housing half-shells 30 are assembled, they form the complete electromechanical interface 120 for connection to the interchangeable battery pack 122. For this purpose, the one part 158 of the first interface module 118 is first inserted into the partial opening 156 of the first housing half-shell 30. Subsequently, the contact plate 134 is also inserted into the first part 158 of the first interface module 118 via a tongue and groove connection.

Furthermore, an adapter plate 160, which is structurally separate from the first interface module 118, is provided with a first power electronics unit 162, which is electrically connected to the electronics unit 25 of the demolition hammer 10 in such a way that it adapts the electrical operating parameters provided by the interchangeable battery pack 122 to the electronics unit 25 of the demolition hammer 10. This allows the first power electronics 162 to be flexibly adapted to the electronics unit 25 of the demolition hammer 10. The electrical connection between adapter plate 160 and electronics unit 25 can, for example, be made via corresponding cable connections not shown. In addition, the adapter plate 160 is electrically connected to the contact plate 134 via plug contacts 164. The adapter plate 160 is inserted into the first housing half-shell 30 and pre-fixed there with a positive fit using a tongue and groove connection. Finally, the second housing half-shell 30 with the second part 158 of the electromechanical interface 118 correspondingly inserted into its partial opening 156 is placed on the first housing half-shell 30 in the manner already described and screwed to the first housing half-shell 30. This clamps and fixes the first interface module 118 and the adapter plate 160 between the two housing half-shells 30.

Figure 7:
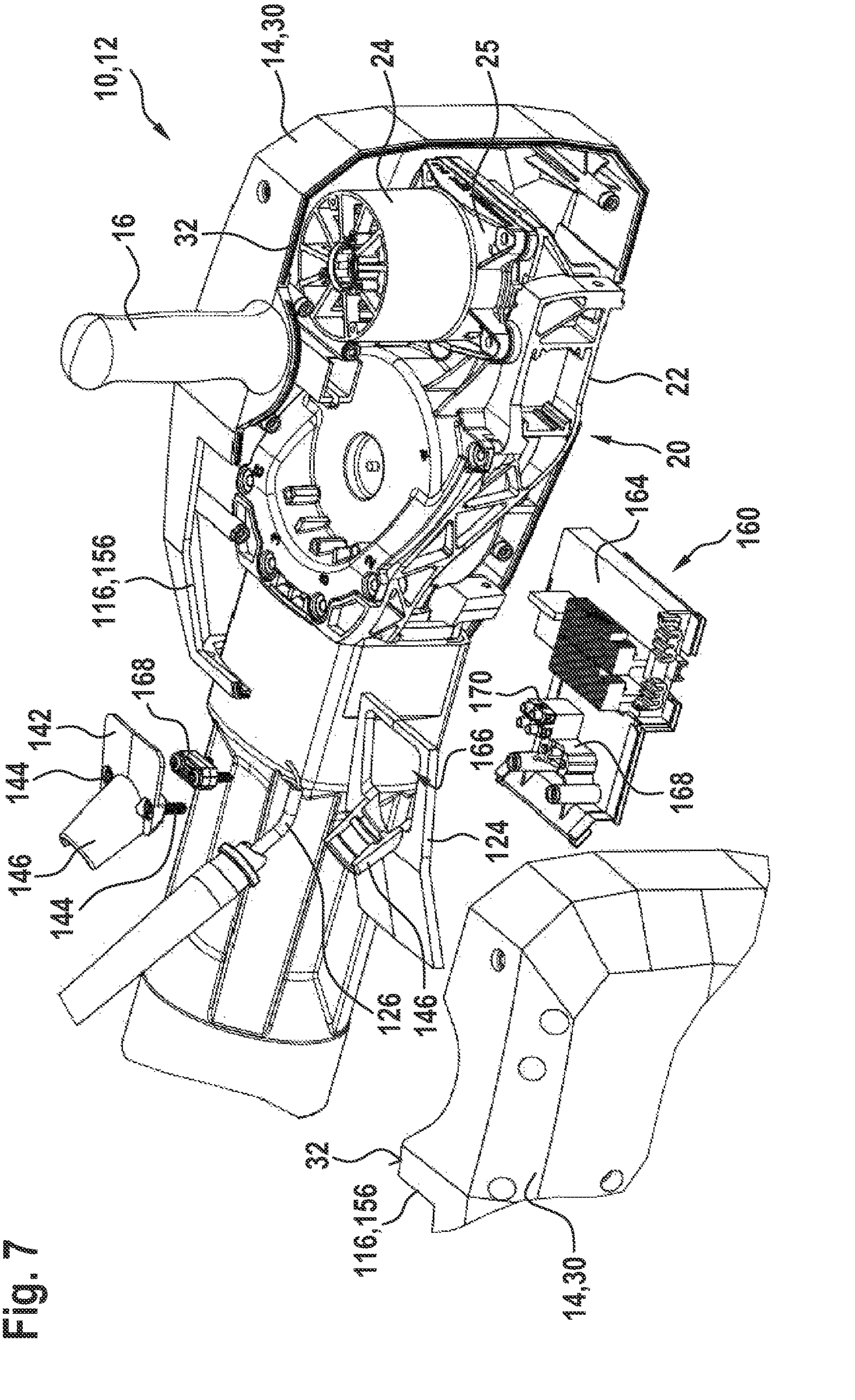
FIG. 7: a perspective exploded view of an installation sequence for the demolition hammer equipped with the second interface module for power supply by way of a mains cable.

FIG. 7 shows an imagined installation sequence for the demolition hammer 10 equipped with the second interface module 124 for power supply by way of the mains cable 126 in a perspective exploded view. As in FIG. 6, the components of the anti-vibration system described above have been largely omitted for the sake of clarity. Corresponding to the first interface module 118, the second interface module 124 comprises second power electronics 164, which is electrically connected to the electronics unit 25 of the demolition hammer 10 in such a way that it adapts the electrical operating parameters provided via the mains cable 126, in particular the mains voltage $U_{AC}$, to the electronics unit 25. In addition to reducing the alternating mains voltage $U_{AC}$, this also includes rectifying and filtering it. As already described for the exemplary embodiment according to FIG. 6, the opening 116 of the outer housing 14 is also divided into two equally sized partial openings 156 along the connecting edges 32 of the two housing half-shells 30. In contrast to the first interface module 118, however, the second interface module 124 is now designed in two parts in such a way that it has the insert 142, which can be inserted into an opening 166 by the operator of the demolition hammer 10 and can be firmly connected to the mains cable 126 via the fixing flange 146. For this purpose, the fixing flange 146 is designed in two parts such that one half is arranged on the insert 146 and the other half on the interface module 124. By joining the insert 142 and the interface module 124 together, the mains cable 126 or a cable grommet 148 encasing it is fixed in the interface module 124. The insert 142 can be fixed to the second interface module 124 by way of the screw connections 144, which are screwed into corresponding threaded bores in the impact mechanism carrier 22.

The second power electronics 164 is arranged on the adapter plate 160, which is structurally separate from the second interface module 124. This is inserted into the first housing half-shell 30 as shown in the exemplary embodiment in FIG. 6 and pre-fixed there with a positive fit using a tongue and groove connection. The adapter plate 160 also includes a clamping device 168 for fixing the mains cable 126 and a luster clamp 170 for the electrical connection of the mains cable 126 to the second power electronics 164. To complete the installation, the second housing half-shell 30 is placed on the first housing half-shell 30 in the manner already described and screwed to it.

Figure 4B:
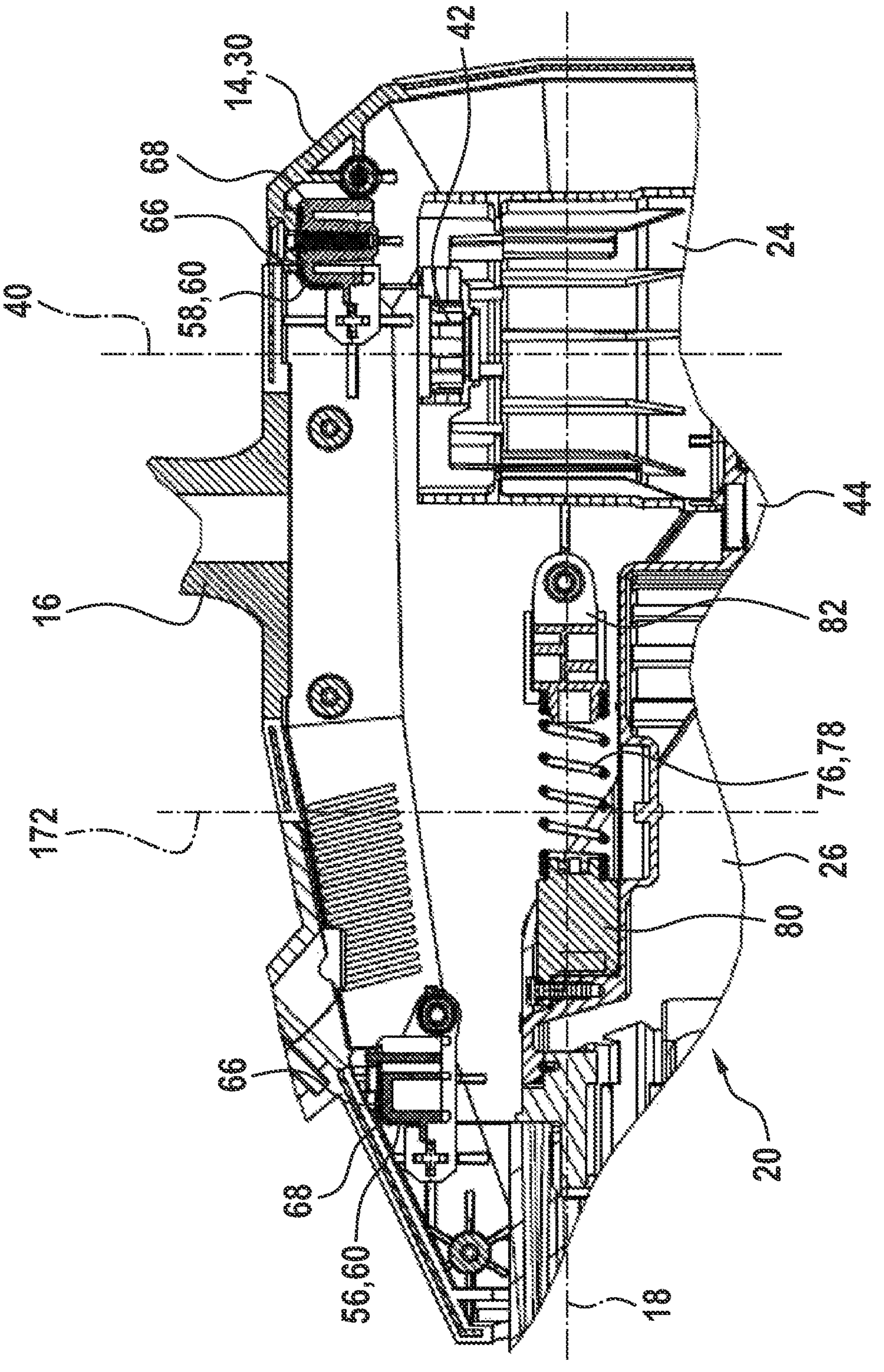
Figure 8:
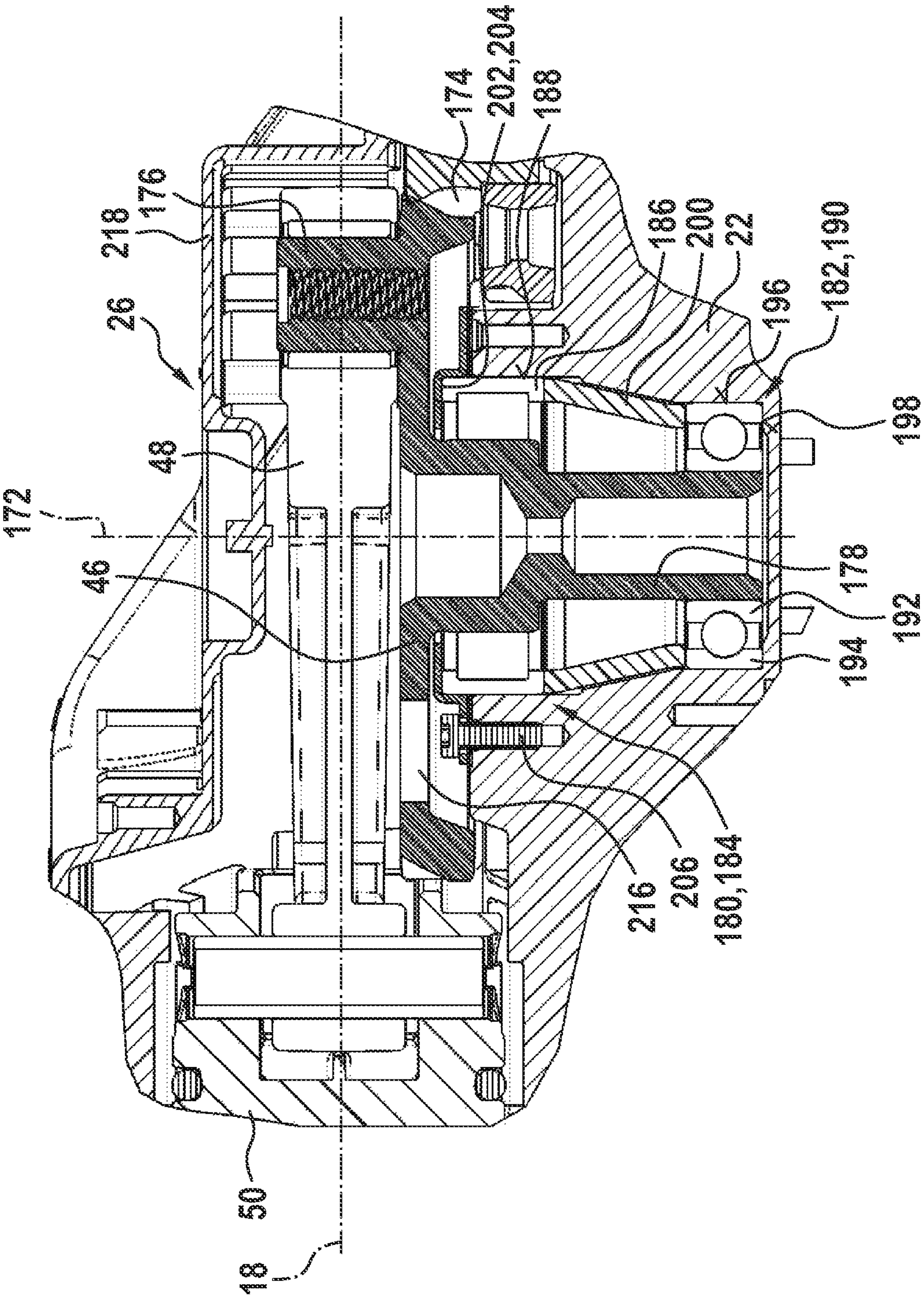
FIG. 8: an exemplary embodiment of an eccentric assembly of the demolition hammer in a section along a plane formed by the axis of the impact mechanism and an eccentric axis of the eccentric assembly.

FIG. 8 shows a section through the eccentric assembly 26 of the demolition hammer 10 along the impact mechanism axis 18. The eccentric assembly 26 comprises, inter alia, the eccentric wheel 46 mounted for rotation about an eccentric axis 172 in the impact mechanism carrier 22 and the connecting rod 48 driven in an oscillating manner by the eccentric wheel 46, which in turn drives the impact piston 50 of the impact mechanism assembly 20 in the manner already described. With reference to FIG. 4*b*, the eccentric axis 172 is aligned parallel to the motor axis 40 of the electric motor 24 and perpendicular to the impact mechanism axis 18 of the impact mechanism assembly 20. The eccentric wheel 46 has an external toothing 174 (see also FIG. 10), via which it is driven by the motor shaft 42 of the electric motor 24 by way of the gearbox 44. Furthermore, the eccentric wheel 46 has an eccentric boss 176 arranged eccentrically to the eccentric axis 18, by way of which the rotational movement of the eccentric wheel 46 is converted into a linear oscillating or translatory movement of the connecting rod 48. In order to firmly fix the eccentric wheel 46—except for its rotational degree of freedom about the eccentric axis 18—in the impact mechanism carrier 22, the eccentric wheel 46 has a centrally arranged eccentric hub 178 formed on one side, which is mounted along the eccentric axis 18 on a side of the eccentric wheel 46 facing away from the connecting rod 48 proximally with a floating bearing 180 and distally with a fixed bearing 182 in the impact mechanism carrier 22.

The floating bearing 180 is designed as a cylindrical roller bearing 184, the inner bearing running surface of which is formed by the eccentric hub 178, which is axially displaceable in the cylindrical roller bearing 184. The cylindrical roller bearing 184 thus allows axial displacement of the eccentric wheel 46 in the impact mechanism carrier 22 and does not absorb any loads in the direction of the eccentric axis 18. It also offers the advantage that it has a compact installation space and can absorb a very high force transverse to the eccentric axis 18 due to its linear contact surface to the eccentric hub 178. Furthermore, the cylindrical roller bearing 184 has an outer ring 186, which is held in a first sliding seat 188 of the impact mechanism carrier 22. The sliding seat 188 enables particularly easy installation in the impact mechanism carrier 22. Instead of the cylindrical roller bearing 184, other embodiments with other types of rolling or plain bearings are also conceivable as floating bearings 180.

The fixed bearing 182 is designed as a deep groove ball bearing 190. It has an inner ring 192 and an outer ring 194, wherein the inner ring 192 is connected to the eccentric hub 178 of the eccentric wheel 46 without play via an interference fit and the outer ring 194 is held in a second sliding seat 196 of the impact mechanism carrier 22. Thus, the deep groove ball bearing 190 fixes the eccentric hub 178 or the eccentric wheel 46 along the eccentric axis 18 translationally both in the direction of the eccentric wheel 46 and in the direction of the impact mechanism carrier 22. The interference fit provides a backlash-free fixation and guarantees a heavy-duty and durable translational and rotational connection between the inner ring 192 and the eccentric hub 178. Instead of a press fit, alternative connection options between the inner ring 192 and the eccentric hub 178, such as axial stops on the eccentric hub with circlips, hub collars, screw connections or the like, are also possible.

The second sliding seat 196 of the impact mechanism carrier 22 has an axial end stop 198, via which the outer ring 194 of the deep groove ball bearing 190 is fixed along the eccentric axis 18 in a direction facing away from the eccentric wheel 46. In addition, the outer ring 194 of the deep groove ball bearing 190 is fixed along the eccentric axis 18 in a direction facing the eccentric wheel 46 via a hollow cylindrical spacer sleeve 200 with an outer circumference tapering conically along the eccentric axis 18 in the direction of the deep groove ball bearing 190. The spacer sleeve 200 is axially supported on the one hand by the outer ring 194 of the deep groove ball bearing 190 and on the other hand by the outer ring 186 of the cylindrical roller bearing 184. This arrangement allows particularly easy installation of the deep groove ball bearing 190, the spacer sleeve 200 and the cylindrical roller bearing 184 as well as the remaining components of the eccentric assembly 26 in the impact mechanism carrier 22 in a single direction along the eccentric axis 18.

Finally, the cylindrical roller bearing 184 is fixed axially along the eccentric axis 18 via its outer ring 186 by way of a fixing element 204 in the impact mechanism carrier 22, which is designed as a sheet metal part 202, via a plurality of screw connections 206. Due to the thin wall thicknesses of the sheet metal part 202, the cylindrical roller bearing 184 can be installed at a minimum distance from the eccentric wheel 46 in order to minimize the bearing loads caused by the load application zones of the toothing and connecting rod forces as far as possible.

Figure 9:
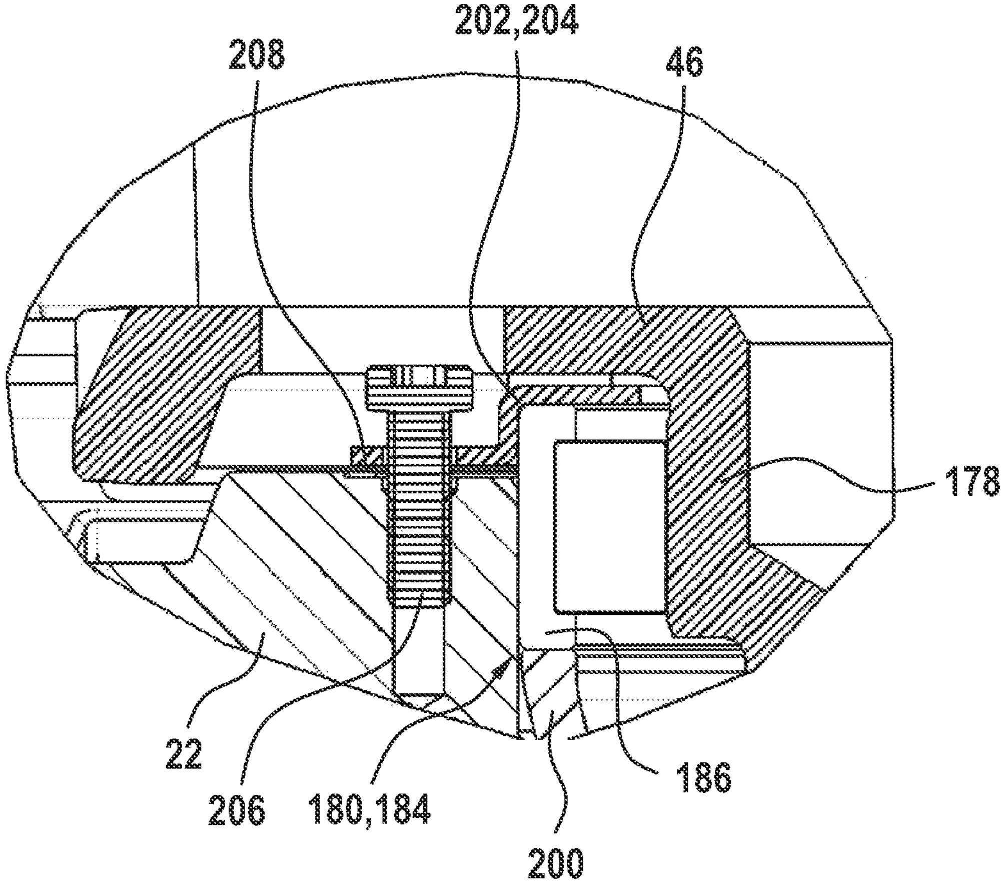
FIG. 9: a sectional enlargement of the section from FIG. 8, FIG. 10: a perspective view of a structural unit formed from components of the eccentric assembly according to FIG. 8, and FIG. 11: a further exemplary embodiment of the eccentric assembly of the demolition hammer in a sectional view as shown in FIG. 8.

FIG. 9 shows a sectional enlargement of the screw connection 206 from FIG. 8, although in contrast to FIG. 8 it is not yet tightened. An air gap 208 extending in the direction of the eccentric axis 18 is provided between the impact mechanism carrier 22 and the sheet metal part 202, which serves as a tolerance compensation and enables deformation of at least one of the components of the tensioning chain when the sheet metal part 202 is screwed tight, so that a correspondingly secure tensioning results. This ensures gap-free support of the sheet metal part 202 despite the usually unavoidable dimensional tolerances of the components.

Figure 10:
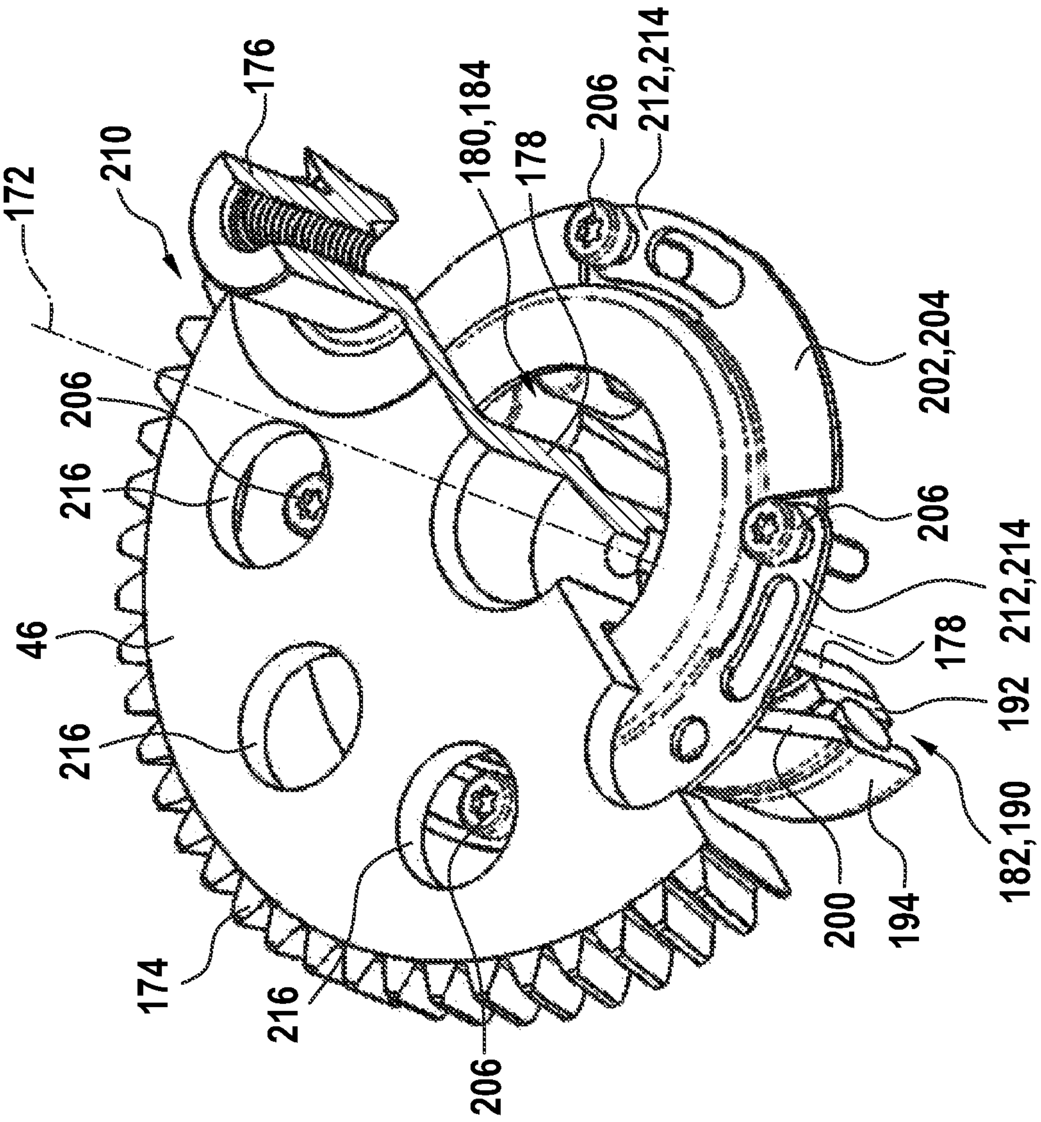

FIG. 10 shows a perspective view of a structural unit 208 of the eccentric assembly 26 consisting of the eccentric wheel 46, the floating bearing 180 designed as a cylindrical roller bearing 184, the fixed bearing 182 designed as a deep groove ball bearing 190, the spacer sleeve 200 and the fixing element 202 designed as a sheet metal element 204. The fixing element 202 has a spring-loaded tongue 212 for each screw connection 206. If the fixing element 202 is designed as a sheet metal element 204, the tongue 212 is designed as a sheet metal tongue 214. However, it is also conceivable that the fixing element 202 and thus also its tongues 212 consist of another elastic and at the same time strong material, such as a plastic reinforced by way of carbon or glass fibers or the like. The tongues 212 of the fixing element 202 have the effect of reducing or closing the air gap 208 in the firmly connected state of the fixing element 202 with the impact mechanism carrier 22 in such a way that sufficient deformation and pretensioning is ensured by the tongues 212 bearing firmly against the opposite side of the impact mechanism carrier 22. In order to enable the screw connections 206 in the inserted state of the structural unit 208 in the impact mechanism carrier 22, the eccentric wheel 46 has a plurality of bores 214, which are congruent with the positions of the screw connections 206 in the direction of the eccentric axis 172. However, it is also conceivable that, for reasons of rigidity or weight, fewer or more bores 214 are provided in the eccentric wheel 46 than there are screw connections 206. To complete the installation of the eccentric assembly 26, the connecting rod 48 is installed on the eccentric boss 176 and the eccentric assembly 26 is sealed by way of a cover 218 (see FIG. 8) connected to the impact mechanism carrier 22.

Figure 11:
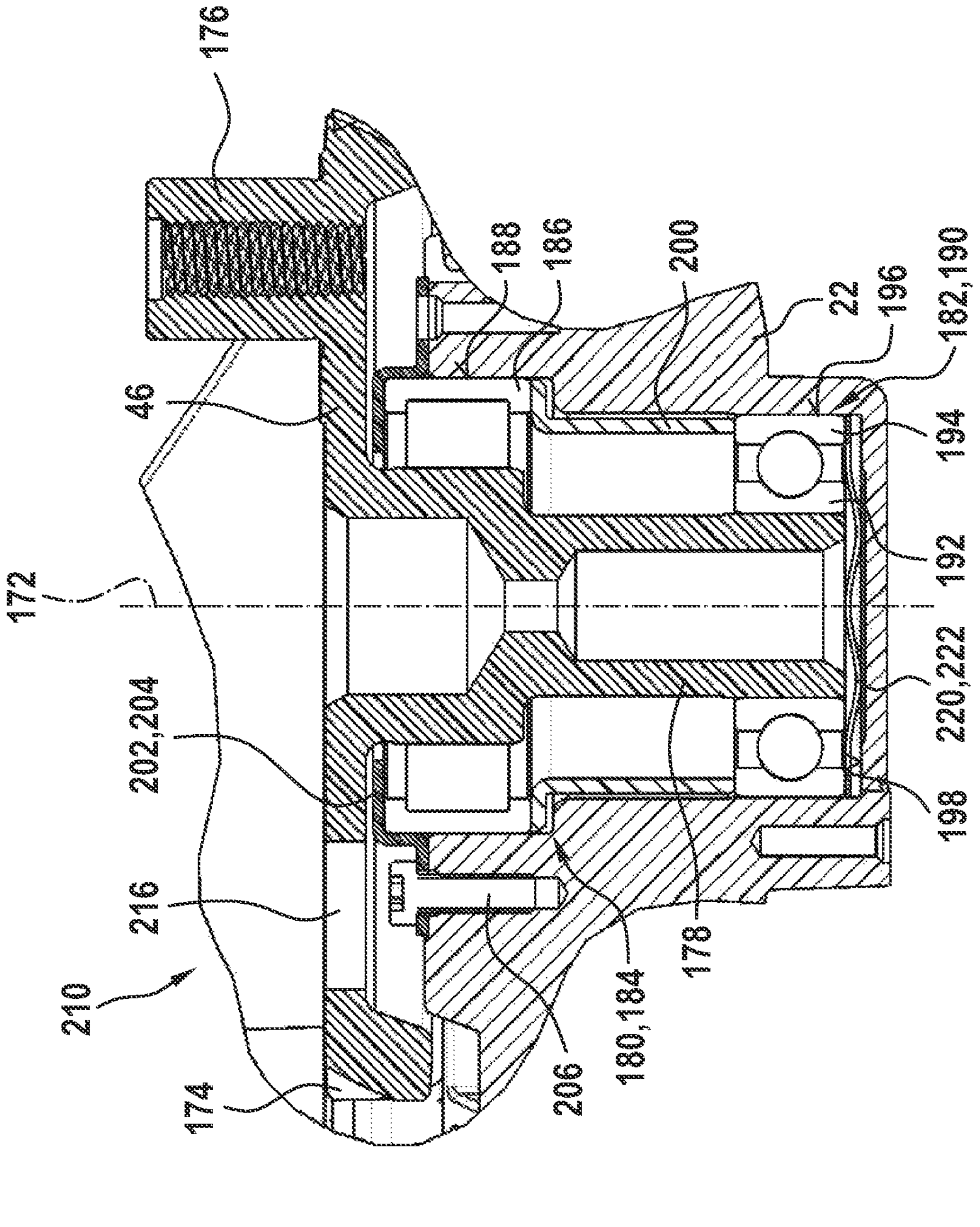

FIG. 11 shows a further exemplary embodiment for fixing the structural unit 210 of the eccentric assembly 26 in the impact mechanism carrier 22. Between the axial end stop 198 of the second sliding seat 196 and the outer ring 194 of the deep groove ball bearing 190, an elastic component 220 is provided which acts along the eccentric axis 18 in a direction facing the eccentric wheel 46 and is designed as a wave spring 222. The upper stop of the deep groove ball bearing 190 is firmly connected to the impact mechanism carrier 22 via the spacer sleeve 200, which is cylindrical rather than conical in this case, and the cylindrical roller bearing 184 via the fixing element 202. In order not to hinder the rotation of the eccentric wheel 46, the wave spring 222 is designed in such a way that it does not touch the inner ring 192 of the deep groove ball bearing 190. The elastic component 220 thus assumes the task of tolerance compensation with the same advantages as the air gap 208 in combination with the tongues 212 of the fixing element 202. However, it is also conceivable to use these components in combination. Instead of the wave spring 222, other elastic components 220, such as an elastomer ring or the like, can also be used.

Finally, it should be pointed out that the exemplary embodiments shown are not limited to FIGS. 1 through 11 or to the shape and proportions of the assemblies of the hand-held power tool 12 described therein.

What is claimed is:

1. A hand-held power tool, comprising:

an impact mechanism assembly that includes an electric motor;

an eccentric assembly; and an impact pin configured to oscillate linearly along an impact mechanism axis, wherein the eccentric assembly includes (i) an eccentric wheel mounted in an impact mechanism carrier of the impact mechanism assembly and configured to rotate about an eccentric axis, and (ii) a connecting rod driven by the eccentric wheel and operably coupled to said impact pin to oscillate said pin, wherein the electric motor has a motor shaft along a motor axis, which is configured to drive the impact pin by way of the eccentric wheel and the connecting rod, wherein the eccentric wheel has an eccentric hub formed on one side, which is mounted along the eccentric axis on a side of the eccentric wheel facing away from the connecting rod proximally with a floating bearing and distally with a fixed bearing in the impact mechanism carrier, wherein the fixed bearing has an inner ring and an outer ring, in which the inner ring is connected to the eccentric hub of the eccentric wheel without play via an interference fit, and the outer ring is held in a second sliding seat of the impact mechanism carrier, and wherein the outer ring of the fixed bearing is fixed along the eccentric axis in a direction facing the eccentric wheel via a hollow cylindrical spacer sleeve, which is axially supported on the one hand via the outer ring of the fixed bearing and on the other hand via the outer ring of the floating bearing.

2. The hand-held power tool according to claim 1, wherein:

the floating bearing is designed as a cylindrical roller bearing, and the fixed bearing is designed as a deep groove ball bearing.

3. The hand-held power tool according to claim 1, wherein the floating bearing has an outer ring which is held in a first sliding seat of the impact mechanism carrier.

4. The hand-held power tool according to claim 1, wherein:

the fixed bearing has an inner ring and an outer ring, the inner ring is connected to the eccentric hub of the eccentric wheel without play via an interference fit, and the outer ring is held in a second sliding seat of the impact mechanism carrier.

5. The hand-held power tool according to claim 4, wherein the second sliding seat of the impact mechanism carrier has an axial end stop, via which the outer ring of the fixed bearing is fixed along the eccentric axis in a direction facing away from the eccentric wheel.

6. The hand-held power tool according to claim 4, wherein the outer ring of the fixed bearing is fixed along the eccentric axis in a direction facing the eccentric wheel via a hollow cylindrical spacer sleeve, which is axially supported on the one hand via the outer ring of the fixed bearing and on the other hand via the outer ring of the floating bearing.

7. The hand-held power tool according to claim 6, wherein an outer circumference of the spacer sleeve tapers conically along the eccentric axis from the floating bearing to the fixed bearing.

8. The hand-held power tool according to claim 1, further comprising a fixing element, wherein:

the floating bearing is fixed in the impact mechanism carrier axially along the eccentric axis by way of the fixing element.

9. The hand-held power tool according to claim 8, wherein the fixing element is designed as a sheet metal part which is configured to be connected to the impact mechanism carrier by way of a plurality of screw connections.

10. The hand-held power tool according to claim 8, wherein an air gap extending in the direction of the eccentric axis is provided between the impact mechanism carrier and the fixing element in a not yet in a firmly connected state.

11. The hand-held power tool according to claim 10, wherein the fixing element has a sheet metal tongue for each screw connection which is configured to close the air gap in the firmly connected state of the fixing element.

12. The hand-held power tool according to claim 1, wherein:

the motor axis and the impact mechanism axis are arranged in an angular range of 45° to 135° relative to each other, and the motor axis and the eccentric axis are arranged essentially parallel to one another.

13. The hand-held power tool according to claim 1, further comprising:

an outer housing configured to receive said impact mechanism, wherein said outer housing includes two housing half-shells, on each of which a handle is arranged decoupled from vibrations.

14. The hand-held power tool according to claim 1, wherein the hand-held power tool is a demolition hammer.

15. The hand-held power tool according to claim 1, further comprising a fixing element, wherein:

the outer ring of the floating bearing is fixed in the impact mechanism carrier axially along the eccentric axis by way of the fixing element.

16. The hand-held power tool according to claim 1, wherein:

the motor axis and the impact mechanism axis are arranged essentially at right angles relative to each other, and the motor axis and the eccentric axis are arranged essentially parallel to one another.

17. A hand-held power tool, comprising:

an impact mechanism assembly that includes an electric motor;

an eccentric assembly; and an impact pin configured to oscillate linearly along an impact mechanism axis, wherein the eccentric assembly includes (i) an eccentric wheel mounted in an impact mechanism carrier of the impact mechanism assembly and configured to rotate about an eccentric axis, and (ii) a connecting rod driven by the eccentric wheel and operably coupled to said impact pin to oscillate said pin, wherein the electric motor has a motor shaft along a motor axis, which is configured to drive the impact pin by way of the eccentric wheel and the connecting rod, wherein the eccentric wheel has an eccentric hub formed on one side, which is mounted along the eccentric axis on a side of the eccentric wheel facing away from the connecting rod proximally with a floating bearing and distally with a fixed bearing in the impact mechanism carrier, wherein the floating bearing is fixed in the impact mechanism carrier axially along the eccentric axis by way of a fixing element, wherein an air gap extends in the direction of the eccentric axis between the impact mechanism carrier and the fixing element in a not yet in a firmly connected state; and wherein the fixing element has a spring-loaded tongue for each screw connection which is configured to reduce the air gap in the firmly connected state of the fixing element.

18. A hand-held power tool, comprising:

an impact mechanism assembly that includes an electric motor;

an eccentric assembly; and an impact pin configured to oscillate linearly along an impact mechanism axis, wherein the eccentric assembly includes (i) an eccentric wheel mounted in an impact mechanism carrier of the impact mechanism assembly and configured to rotate about an eccentric axis, and (ii) a connecting rod driven by the eccentric wheel and operably coupled to said impact pin to oscillate said pin, wherein the electric motor has a motor shaft along a motor axis, which is configured to drive the impact pin by way of the eccentric wheel and the connecting rod, wherein the eccentric wheel has an eccentric hub formed on one side, which is mounted along the eccentric axis on a side of the eccentric wheel facing away from the connecting rod proximally with a floating bearing and distally with a fixed bearing in the impact mechanism carrier, wherein the floating bearing is fixed in the impact mechanism carrier axially along the eccentric axis by way of a fixing element designed as a sheet metal part which is configured to be connected to the impact mechanism carrier by way of a plurality of screw connections, wherein the eccentric wheel, the floating bearing, the fixed bearing and the fixing element are collectively designed as a pre-assembled structural unit, and wherein the eccentric wheel has at least one bore for the screw connections of the fixing element.

19. A hand-held power tool, comprising:

an impact mechanism assembly that includes an electric motor;

an eccentric assembly:

an impact pin configured to oscillate linearly along an impact mechanism axis, wherein the eccentric assembly includes (i) an eccentric wheel mounted in an impact mechanism carrier of the impact mechanism assembly and configured to rotate about an eccentric axis, and (ii) a connecting rod driven by the eccentric wheel and operably coupled to said impact pin to oscillate said pin, wherein the electric motor has a motor shaft along a motor axis, which is configured to drive the impact pin by way of the eccentric wheel and the connecting rod, wherein the eccentric wheel has an eccentric hub formed on one side, which is mounted along the eccentric axis on a side of the eccentric wheel facing away from the connecting rod proximally with a floating bearing and distally with a fixed bearing in the impact mechanism carrier, wherein the fixed bearing has an inner ring connected to the eccentric hub of the eccentric wheel without play via an interference fit, and an outer ring held in a second sliding seat of the impact mechanism carrier, and an elastic component acting along the eccentric axis in a direction facing the eccentric wheel and located between the axial end stop of the second sliding seat and the outer ring of the fixed bearing.

20. The hand-held power tool according to claim 19, wherein the elastic component is designed as a wave spring or an elastomeric ring.

* * * * *